United States Patent
Amsellem

(12) 
(10) Patent No.: US 6,178,984 B1
(45) Date of Patent: Jan. 30, 2001

(54) SELF-PRIMING SIPHON, IN PARTICULAR FOR IRRIGATION

(76) Inventor: Maurice Amsellem, 36, rue Jean Broquin, 69006 Lyon (FR)

( * ) Notice: Under 35 U.S.C. 154(b), the term of this patent shall be extended for 0 days.

(21) Appl. No.: 09/331,126

(22) PCT Filed: Dec. 24, 1997

(86) PCT No.: PCT/FR97/02418

§ 371 Date: Jun. 16, 1999

§ 102(e) Date: Jun. 16, 1999

(87) PCT Pub. No.: WO98/28967

PCT Pub. Date: Jul. 9, 1998

(30) Foreign Application Priority Data

Dec. 26, 1996 (FR) .................................................. 96 16317
Mar. 3, 1997 (FR) .................................................. 97 02699
Apr. 18, 1997 (FR) .................................................. 97 05176
Nov. 12, 1997 (FR) .................................................. 97 14395
Nov. 25, 1997 (FR) .................................................. 97 15058

(51) Int. Cl.[7] .................................................. F04F 10/00
(52) U.S. Cl. .................. 137/142; 137/128; 137/135; 137/140; 137/153
(58) Field of Search ..................................... 137/128, 135, 137/140, 142, 146, 153; 222/187

(56) References Cited

U.S. PATENT DOCUMENTS

| 2,184,025 | * | 12/1939 | Smith et al. | 137/128 |
| 4,124,035 | * | 11/1978 | Rice | 137/128 |
| 5,006,264 | * | 4/1991 | Acuna | 137/140 X |

FOREIGN PATENT DOCUMENTS

791997 * 12/1935 (FR) .................................................. 137/142

* cited by examiner

Primary Examiner—Gerald A. Michalsky
(74) Attorney, Agent, or Firm—Thomas S. Baker, Jr.

(57) ABSTRACT

A self-priming siphon has an inverted U-shaped tube filled with a hydrophilic material where one end of the tube is connected to a smaller diameter tube such that when the other end of the tube is immersed in a liquid, capillary action causes the fluid to rise in the tube above the level of the water and thereafter fall through said one tube end causing a suction which primes the siphon.

26 Claims, 12 Drawing Sheets

SELF-PRIMING SIPHON, IN PARTICULAR FOR IRRIGATION

The present invention relates to a self-priming siphon combining capillary and siphon action, in particular but not exclusively a device for watering plants from a water reserve.

Devices are known utilizing the capillary action to remove water from a container. In this connection reference is made to the French Patent 791 997 which discloses a tube of inverted U-shape comprising an appropriately dimensioned body for capillary action. One of the legs of the U-shape is immersed in the water of a container. The water moves up by capillary action and progresses around the upper portion of the tube prior to moving down within the other leg of the U-tube. But in these known devices, the water is not supplied in a sufficient amount to fill the entire tube and to effect by its downward flow a suction capable of priming the siphon, and the water flow at the outlet of the device remains limited to the amount that can move up by capillary action toward the upper portion of the U-shaped tube, without achieving priming of the siphon. Thus, the output always remains low, since the water flowing down to the outlet does not contribute to suction of the water moving up to the bend of the U-shaped tube.

Currently there exists now watering device which combines at the same time the following advantages:
Watering
- without energy supply
- with an adjustable flow of 0 to several hundreds of liters per day,
- with easy and automatic priming and re-priming of the siphon,
- from any kind of reservoir (2), the level of which is higher than the point of flow.

The present invention aims to provide all these advantages.

In order to obtain these results, the invention functions according to the siphon principle.

The essential feature of the invention is that this siphon is primed by a small quantity of liquid brought by capillary action along a wick as far as the entrance of a pipe into which it can flow, causing suction.

Figure 1:
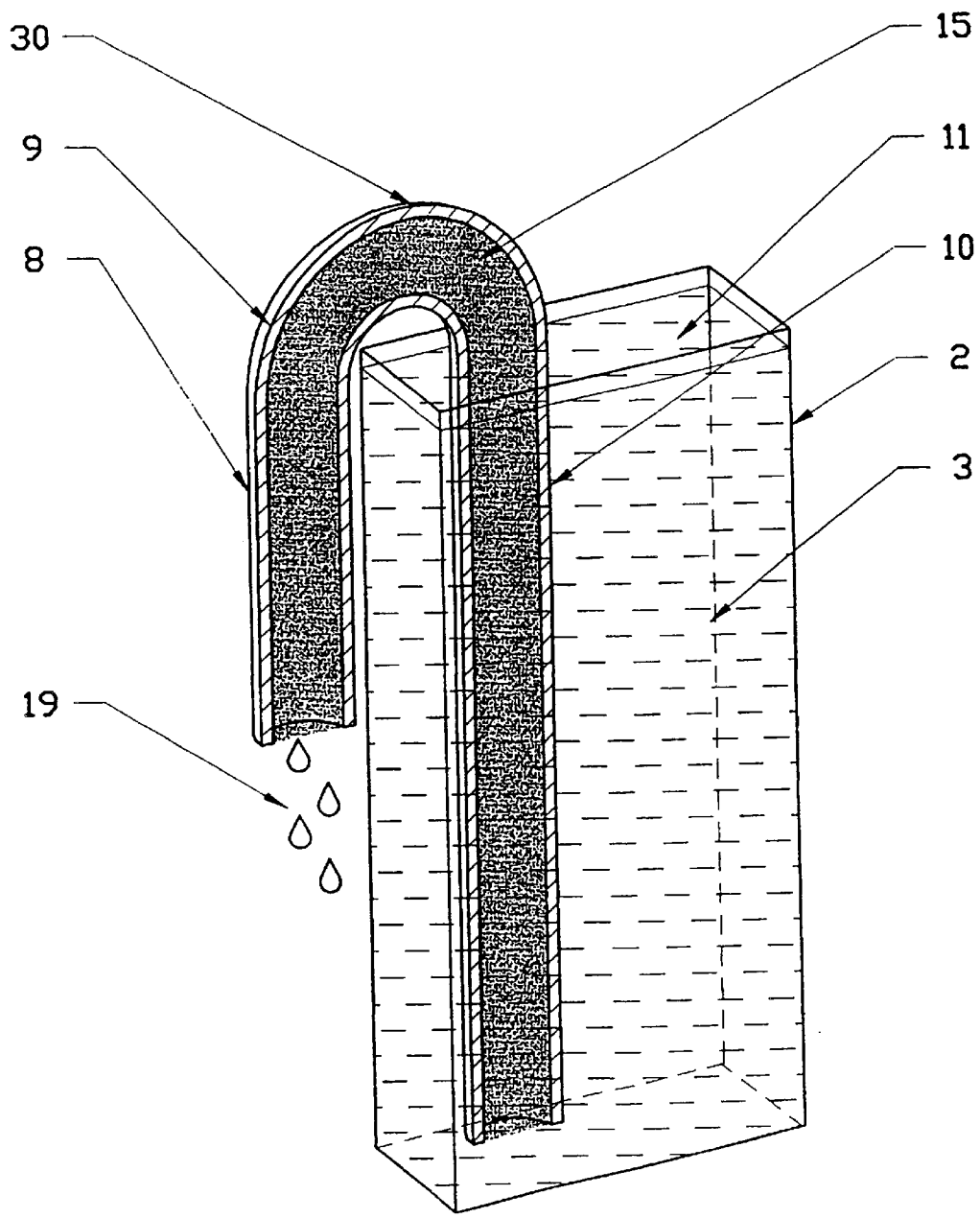
Figure 2:
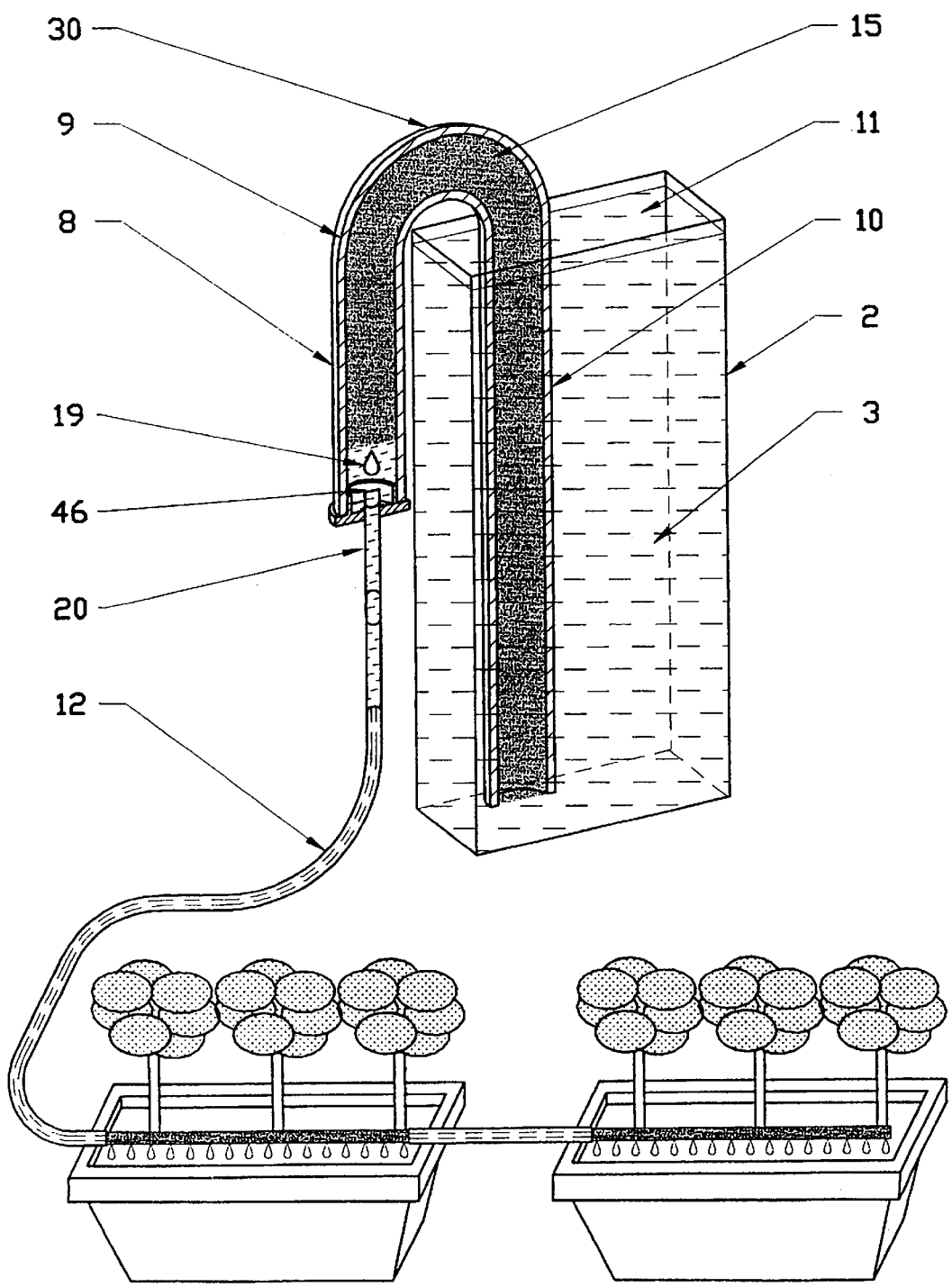
Figure 3:
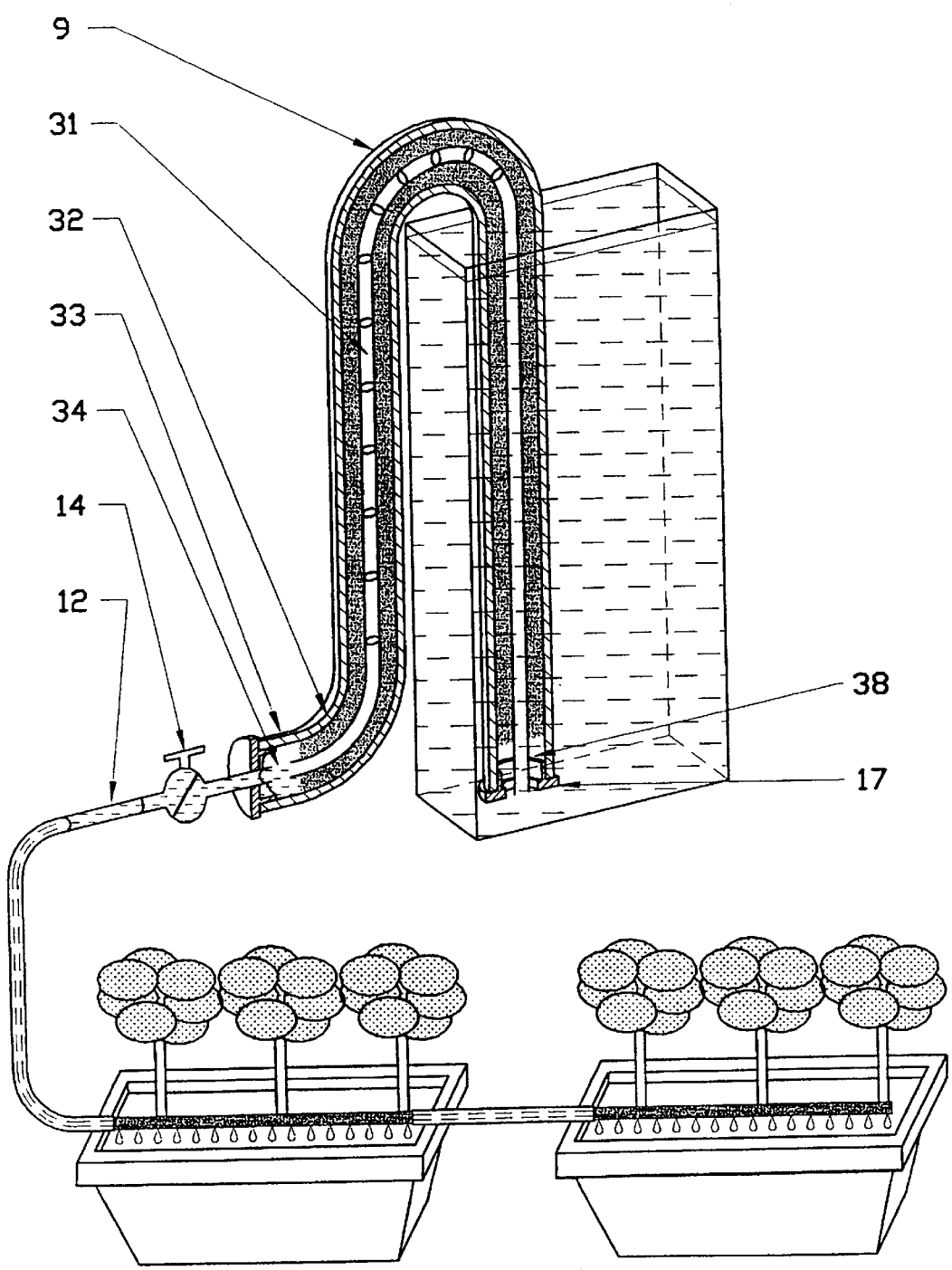
Figure 4:
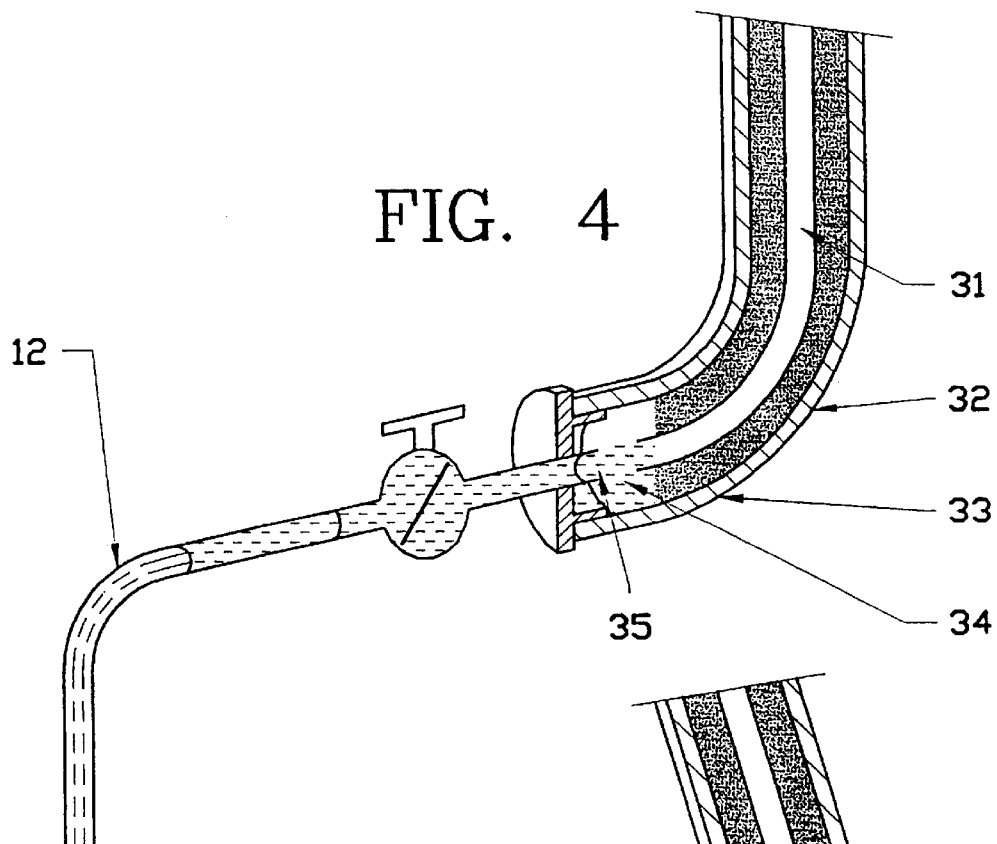
Figure 5:
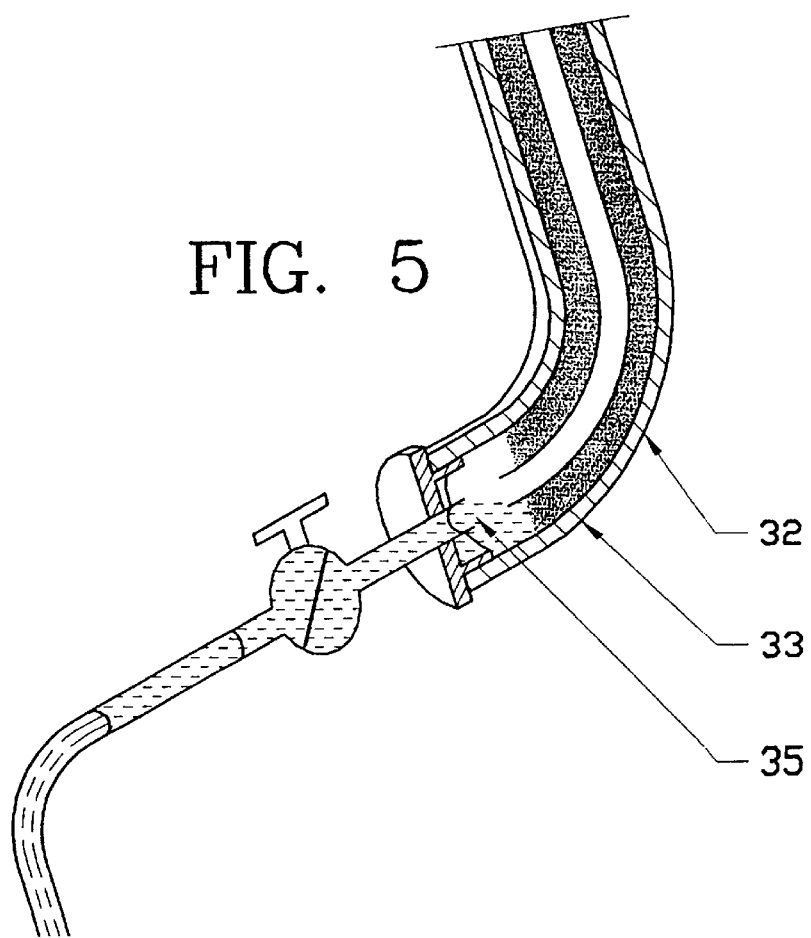
Figure 12:
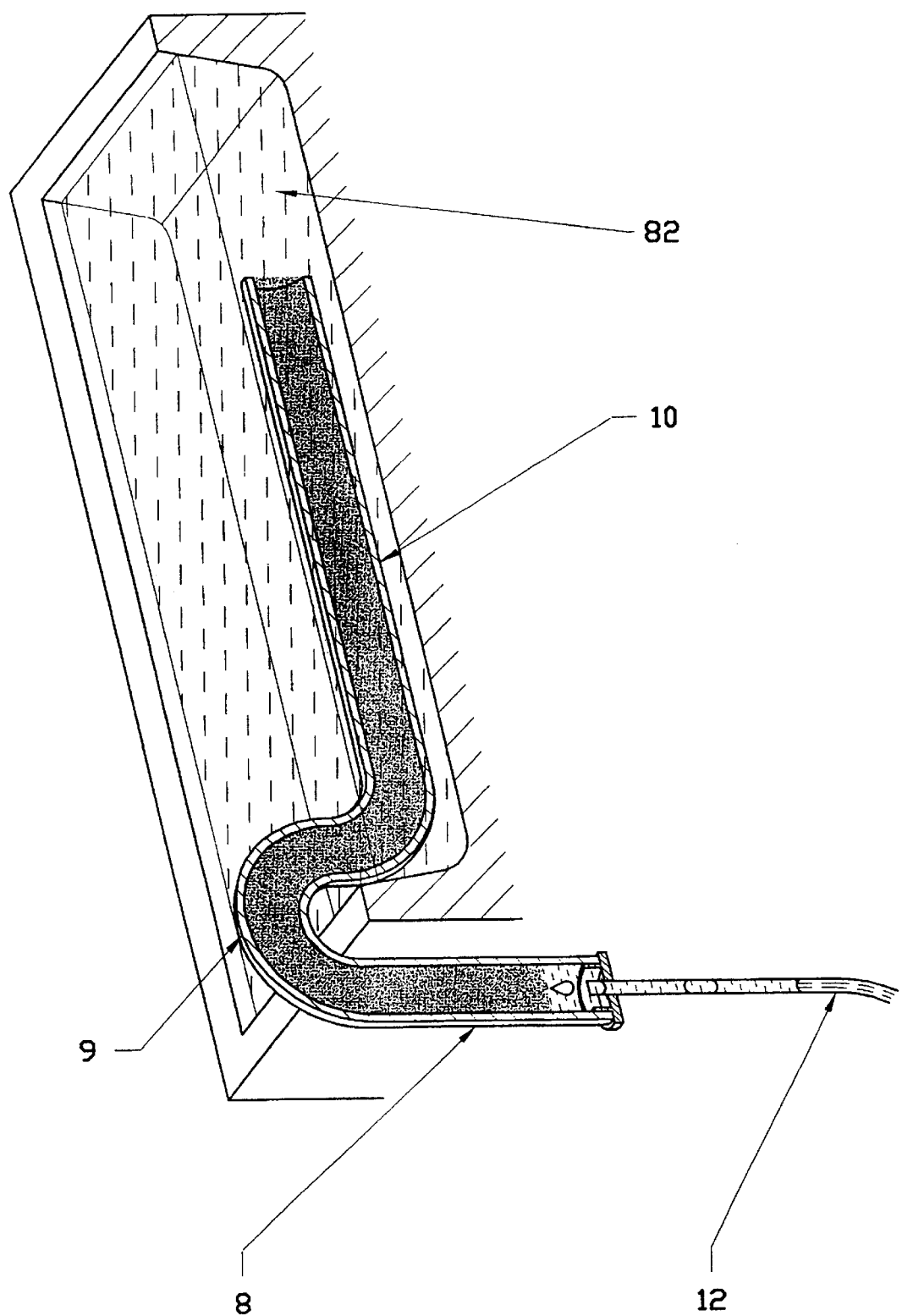
Figure 13:
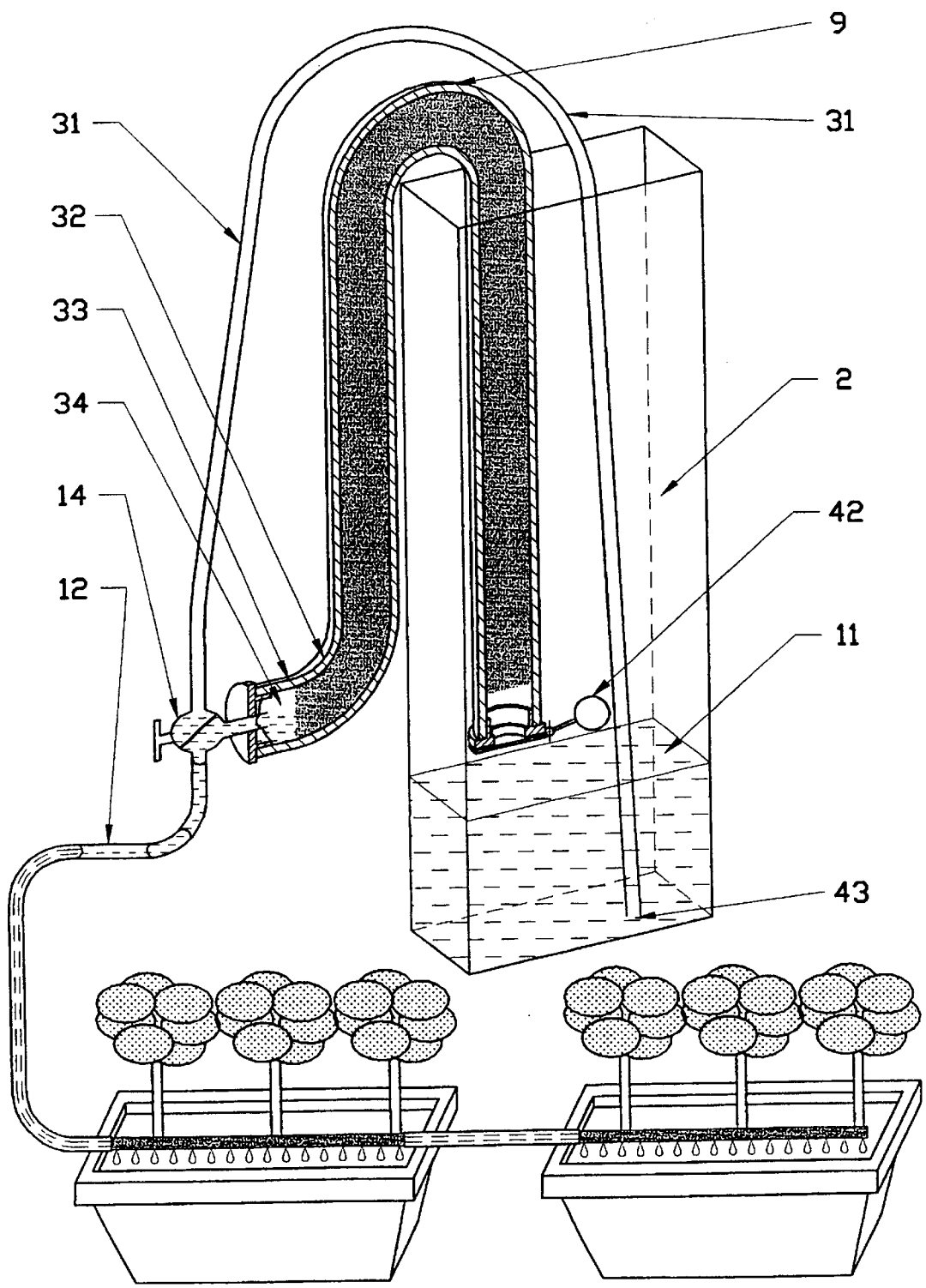

In the Drawings:
FIG. 1 shows schematically a known watering device;
FIG. 2 shows a first embodiment of a watering device according to the invention;
FIGS. 3 and 4 show a first modification of the embodiment of FIG. 2;
FIG. 5 shows a second modification of the embodiment of FIG. 2;
FIGS. 6 to 11 show another embodiments of the watering device according to the invention;
FIG. 12 shows another application of the device according to the invention; and
FIG. 13 shows still another embodiment of the watering device according to the invention.

FIG. 1 represents a known device composed of a tube (9) in the form of a U which contains a hydrophilic material (15).

When branch (10) of the U is plunged into a liquid (3), its immersed portion fills up rapidly up to level (11).

The liquid then rises by capillary action and wets completely the hydrophilic material (15). The liquid carried along by its weight into branch (8) of the U, arrives at its end and leaves in the form of drops (19).

FIG. 2 represents a device according to the invention, in which the branch (8) of the tube (9) is extended by a pipe (12) with an interior diameter smaller than the diameter of the tube (9).

The drops (19) of liquid fall at the entrance (46) of the pipe (12).

If the pipe (12) has a sufficiently small diameter for the liquid not to stream down, said liquid remains at the entrance of the pipe (12) where it forms a plug.

When one or more drops have fallen and the height of the liquid is sufficient for its pressure to be greater than the force of resistance of the superficial tension, the liquid is forced to engage in the pipe (12) where if forms a column (20) which descends, causing a depression.

This depression entrains air bubbles which descend in the pipe. The drops continuing to arrive at the entrance of the pipe (12), small columns (20) of liquid succeed one another in the pipe (12) increasing the depression.

Air bubbles come between the columns of liquid and drain away at the free end of the pipe (12).

This evacuated air is replaced by liquid whose level rises in branch (10) of tube (9).

When the level of this liquid reaches the higher level (30), it pours out into branch (8) and supplies the pipe (12) in a much more abundant manner than a simple wick.

One notes that the flow in the pipe (12) becomes significant, and a function of the fall height, for the device is then functioning as a siphon.

When the system is stabilised in its operating flow rate, it no longer evacuates air bubbles. One notices that in the descending branch (8) some air is left, which does not impair the functioning, for in this branch the liquid streams down, and the suction portion of the siphon doesn't begin until the exit from the pipe (12).

If the liquid is water, a pipe (12) diameter preferably lower than or equal to 6 mm is required.

Pipe (12) diameters of the order of 2, 3 or 4 mm function very well. A diameter of 5 or 6 mm is less favourable to the formation of a column of water.

In fact, the water has a tendency to stream, which has no effect on the priming of the siphon.

This fault can be partially corrected by the choice of the material constituting the pipe (12). For example a slightly roughened interior wall favours the clinging of the water, and can thus prevent its runoff.

For a pipe (12) diameter lower than 2 mm, the flow of the water is more difficult and the volume of air sucked in being more reduced, the priming of the siphon takes longer and is more difficult, indeed even impossible, for a diameter lower than 1 mm.

Another significant feature of the invention is that, when the hydrophilic material (15) is wetted, (either because the siphon has already acted or because it has been deliberately wetted by dipping the device into the water), the priming of the siphon is much more rapid.

In fact, when branch (10) is plunged into the liquid, the latter penetrates it and rises up to level (11), chasing out the air which had been contained in it. This air, as it escapes via branch (8) and pipe (12), drives into the latter several drops of water which form columns which accelerate the priming of the siphon. Moreover, the time which would have been necessary for wetting the hydrophilic material is eliminated since the latter is already wet.

In a case where the choice has been made to wet the hydrophilic material in advance, it is possible to accelerate the priming of the siphon by increasing the quantity of water retained inside branch (8) of the U. This result can be obtained by increasing the quantity of hydrophilic material contained in the descending branch (8) of the U.

It will thus be of interest to increase the volume of branch (8) for example by lengthening it and/or widening it.

It is also possible to increase the quantity of water retained inside the device thanks to a significant feature of the invention which is that the branch (8) of tube (9) comprises at its end a bend (32) and a small horizontal portion (33) which forms a chamber (34) intended to keep a reserve of water when the device has been wetted in advance or during the draining of the siphon (FIG. 3 and FIG. 4).

In another variant, inside this chamber (34), an extension (35) of the pipe (12) prevents a portion of the water from leaving when, in manipulating the system, portion (33) is inclined in relation to the horizontal (FIG. 5).

It is worthwhile for the length of the extension (35) to be sufficient to save enough water in chamber (34) for it to flow out a little via pipe (12) when portion (33) is placed back in the horizontal.

This water, driven into pipe (12) by pressure when branch (10) is plunged into the water reserve, gives through its fall an impetus to start the siphon (a starting effect).

With this device, the priming of the siphon can even be carried out in unfavourable conditions.

For example, when the level (11) of the liquid is too low in relation to level (30) for priming by capillary action, the siphon can all the same be primed by plunging branch (10) partially into the water.

In the case of draining the siphon, due to a lack of water in the reservoir, this feature makes possible quick re-priming as soon as the level of the water rises sufficiently again. This even after several weeks of drought, for the water contained inside the tube has very little chance of evaporating.

Variants

The diameter of the tube (9) must be greater than that of the pipe (12) because it has to contain the hydrophilic material, and in addition comprise sufficient empty space to allow water to pass when the siphon is primed.

With too large a diameter of the tube (9), and more particularly of the rising branch (10), the volume of air to be evacuated is significant, which increases the priming time.

Too small a diameter reduces the flow.

Tests have been carried out with a diameter of 12 mm which makes it possible to introduce the hydrophilic material without packing it too tightly.

It is worthwhile for the hydrophilic material to have a diameter slightly smaller than the interior diameter in order to leave an empty space which favours a good flow of water when the siphon is functioning.

With a tube (9) having an interior diameter of 12 mm, we carried out the two following tests:

with the hydrophilic material of 12 mm in diameter, which thus completely fills the tube, a pipe (12) of 4 mm in diameter and a height difference of 80 cm, the flow rate is 2 liters per hour.

Other things being equal, the hydrophilic material of 12 mm in diameter is replaced by one of 10 mm in diameter, then there is a flow rate of 11 liters per hour.

If, in order to make the functioning easily visible, a transparent tube (9) is used, the water can be seen circulating in the free space between the tube (9) and the hydrophilic material.

Figure 6:
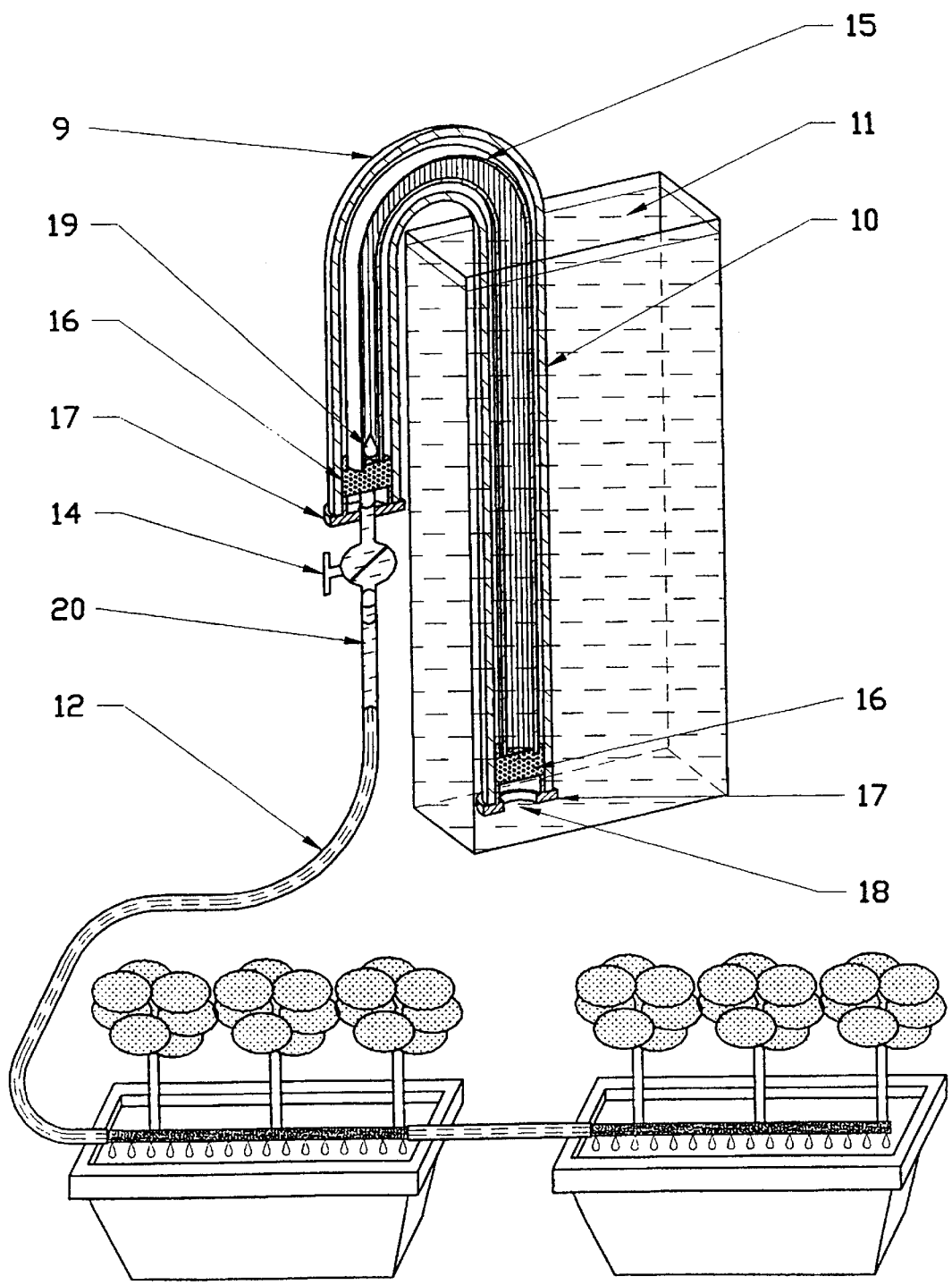

In variants of the device according to the invention, it is possible to delimit in a more precise fashion two paths for the water (FIG. 6).

The hydrophilic material surrounded by a supple and impermeable envelope, open at two ends is introduced into tube (9) with play between the supple envelope and the interior of the tube (9). The water thus circulates in a first path which is the wick enclosed in its envelope; this water, being displaced by capillary action, arrives at the entrance of the pipe (12) and serves to prime the siphon, and then, when the siphon is primed, the water circulates principally in a second path which is the space delimited by the interior of tube (9) on the one hand and the exterior of the supple envelope on the other hand.

The priming time of the siphon depends amongst other things on the quantity of air to be eliminated in the rising branch (10) of tube (9). It is thus advisable for this quantity of air to be as small as possible, and thus it is better to delimit well the volume of the free path which serves for the flow of the sucked-up water.

To do this, in another variant (FIG. 3), a tube (31) is used which has a diameter appreciably smaller than the interior diameter of tube 9 and which is placed inside the latter, over the entire length of the hydrophilic material. The hydrophilic material filling the rest of the empty space between tube (9) and pipe (31).

In the example represented on FIG. 3, which is the best embodiment of the invention, tube (9) has a diameter of 12 mm, and pipe (31) a diameter of 4 mm, equal to that of pipe (12). Pipe (31), which acts as a path for the flow of the sucked-up water is thus capable of providing the necessary flow rate to supply pipe (12), whilst having a small interior volume.

The hydrophilic material occupies the space between tube (9) and pipe (31), thus the quantity of air to be eliminated is reduced and this leads to quicker priming and a more significant flow.

In this device, it is possible to provide at the entrance of tube (9) a space (38) between the stopper (17) on the one hand and the hydrophilic material and pipe (31) on the other hand. This, in order to permit the water to feed the two paths.

In order to avoid the risk of obstructing pipe (31), the stopper (17) can be replaced by a grid or a foam pad.

In another variant, pipe (31) can be double or multiple in order to increase the flow.

In another variant, pipe (31) can be extended to the outside of tube (9) on the side of branch (10) in order to be able to go and suck in the liquid in a deeper point of the receptacle (2).

In another variant represented in FIG. 13, pipe (31) is placed on the exterior of tube (9) and is connected either into chamber (13) or directly into the extension of pipe (12), thanks to a T-shaped connector or a tap (14).

In order to prevent the draining of the siphon which would be caused by air entering into tube (9) and passing across the hydrophilic material, a device can be provided which closes tube (9) when the level of the water drops to the point of risking no longer immersing the entrance of tube (9), whilst leaving pipe (31) open.

If pipe (31) is outside tube (9), it is easy to provide at the entrance of the branch, a float valve (42) which closes when the water reaches a pre-determined level (FIG. 13).

When the siphon is primed and the float valve (42) is closed, the siphon continues to act as long as the level (11) of the liquid does not drop below the end (43) of pipe (31).

Figure 7:
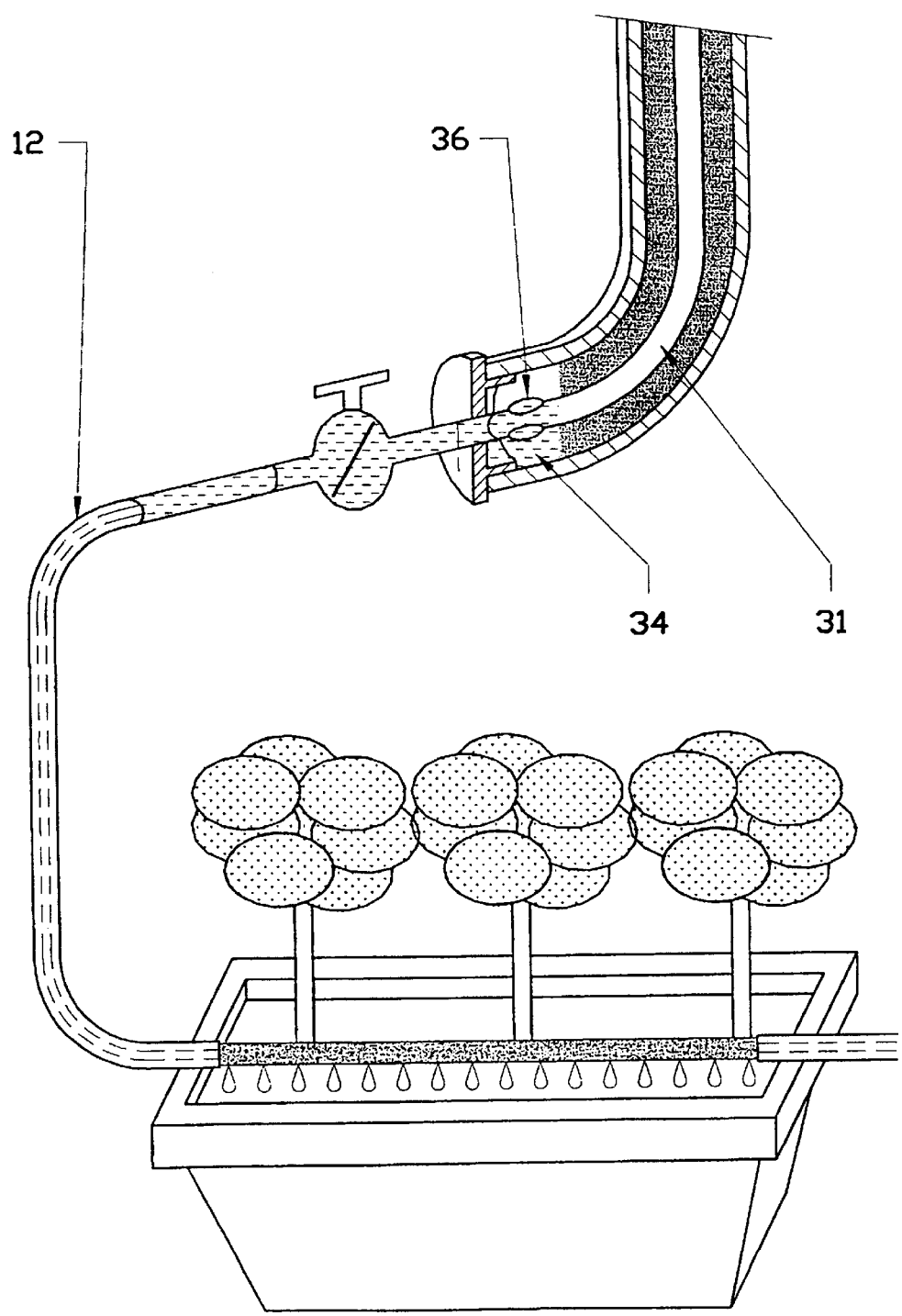

In another variant represented in FIG. 7, pipe (31) and pipe (12) are formed from a single continuous tube. One or more holes (36) are bored into this tube in the portion which crosses chamber (34). When, by capillary action, through the hydrophilic material, the water arrives in chamber (34) and fills it as far as reaching the hole or holes, said water enters pipe (12), dropping down, it causes suction in pipe (31). The water then begins to circulate in pipe (31) to supply pipe (12). The siphon begins to function.

An important feature of the device represented on FIG. 3 is that the pipe (31), once it is filled with water, functions as a siphon as long as the level (11) of the liquid in the reservoir is higher than the level of the pipe exit (31).

Thus one has a siphon composed of pipe (31) and whose potential for suction is added to that of pipe (12).

This is of interest when the fall height available is small (for example if the reservoir is the reservoir of a flush tank for a w.c. and if the plants to be watered are tubs placed on the ground).

In all the cases quoted above, it is possible to place a tap (14) on pipe (12), so as to be able to adjust the flow.

In one variant, the hydrophilic material (15) can be a granular material such as sand.

In order to allow the water to pass, this granular material should only be slightly compacted. The result of this is that it can move in the interior of tube (9), which produces an empty space, and the water does not cross this discontinuity.

In order to avoid this disadvantage, an important feature of the invention is that the sand is stabilised inside the tube thanks to a structure which keeps it in place.

Figure 8:
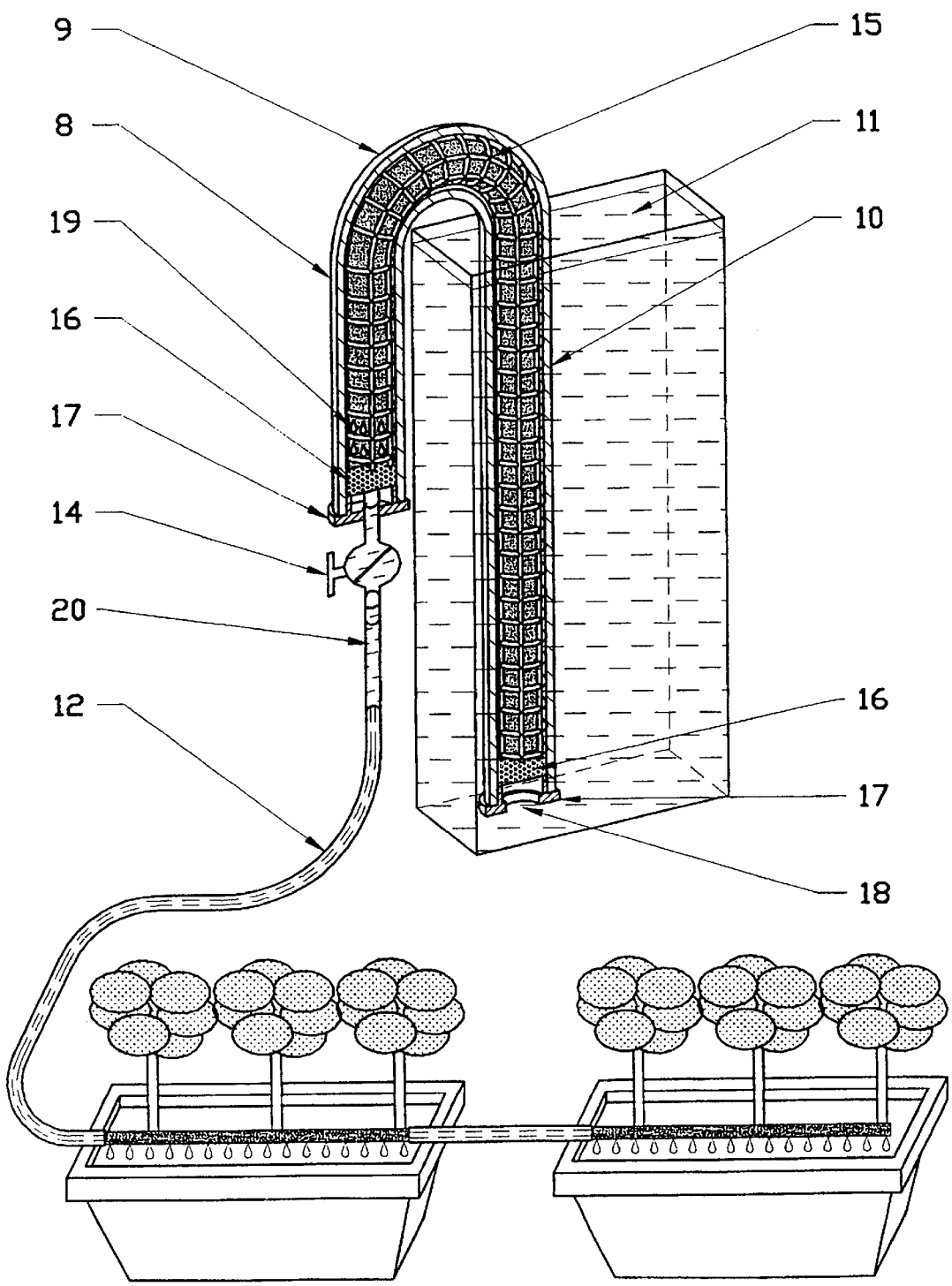
Figure 9:
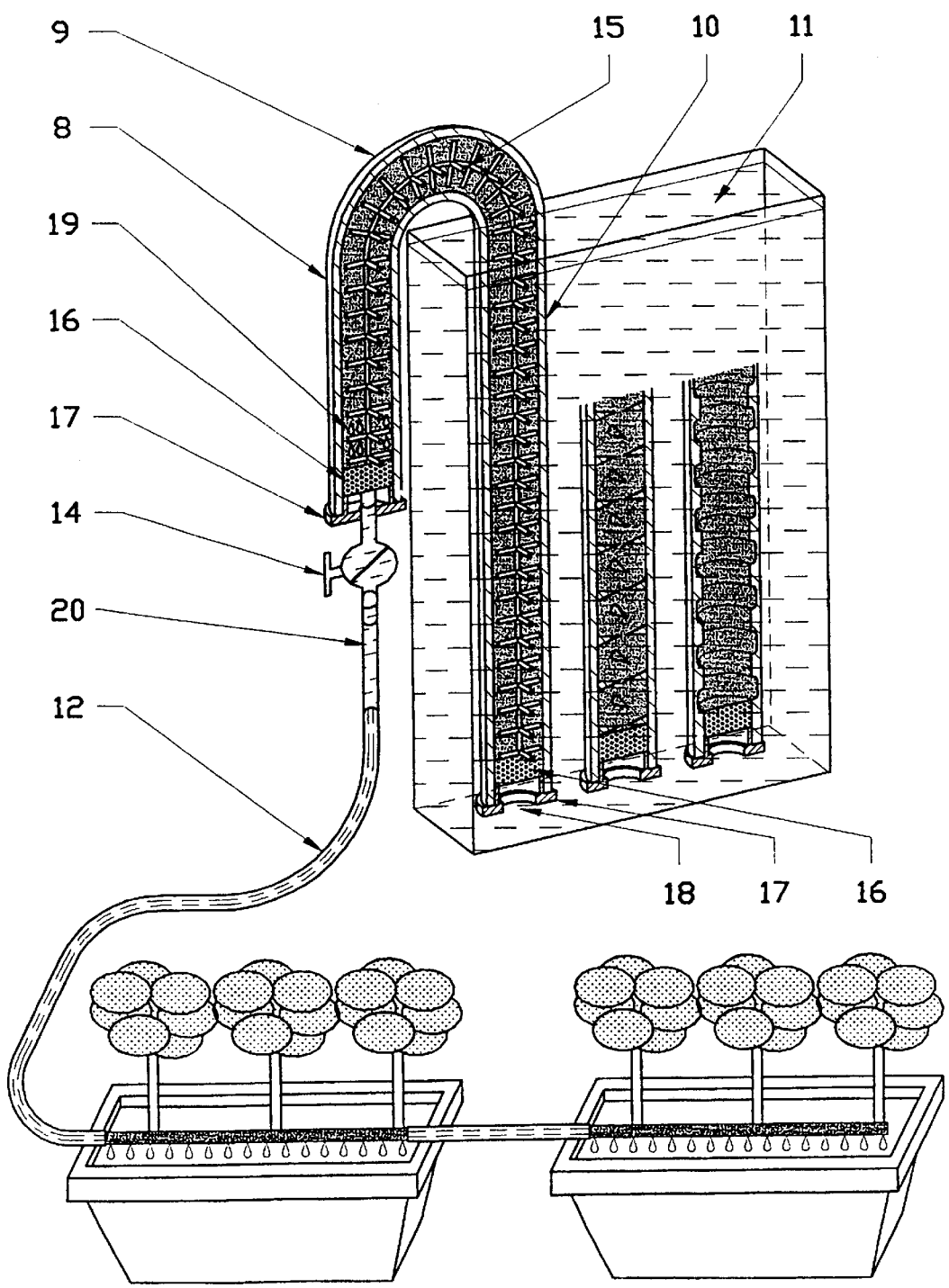

In the sample embodiment represented in FIG. 8, the sand is stabilised thanks to a tube made of semi-rigid (for example plastic) netting with a mesh size of between 2 and 6 mm introduced inside tube (9).

But other devices can be used, for example an internal wall of the tube made rough, or equipped with spikes (FIG. 9), projections or grooves.

It is advantageous for the tube filled with sand to be transparent in order to be able to check whether it is well filled with the granular material.

Figure 10:
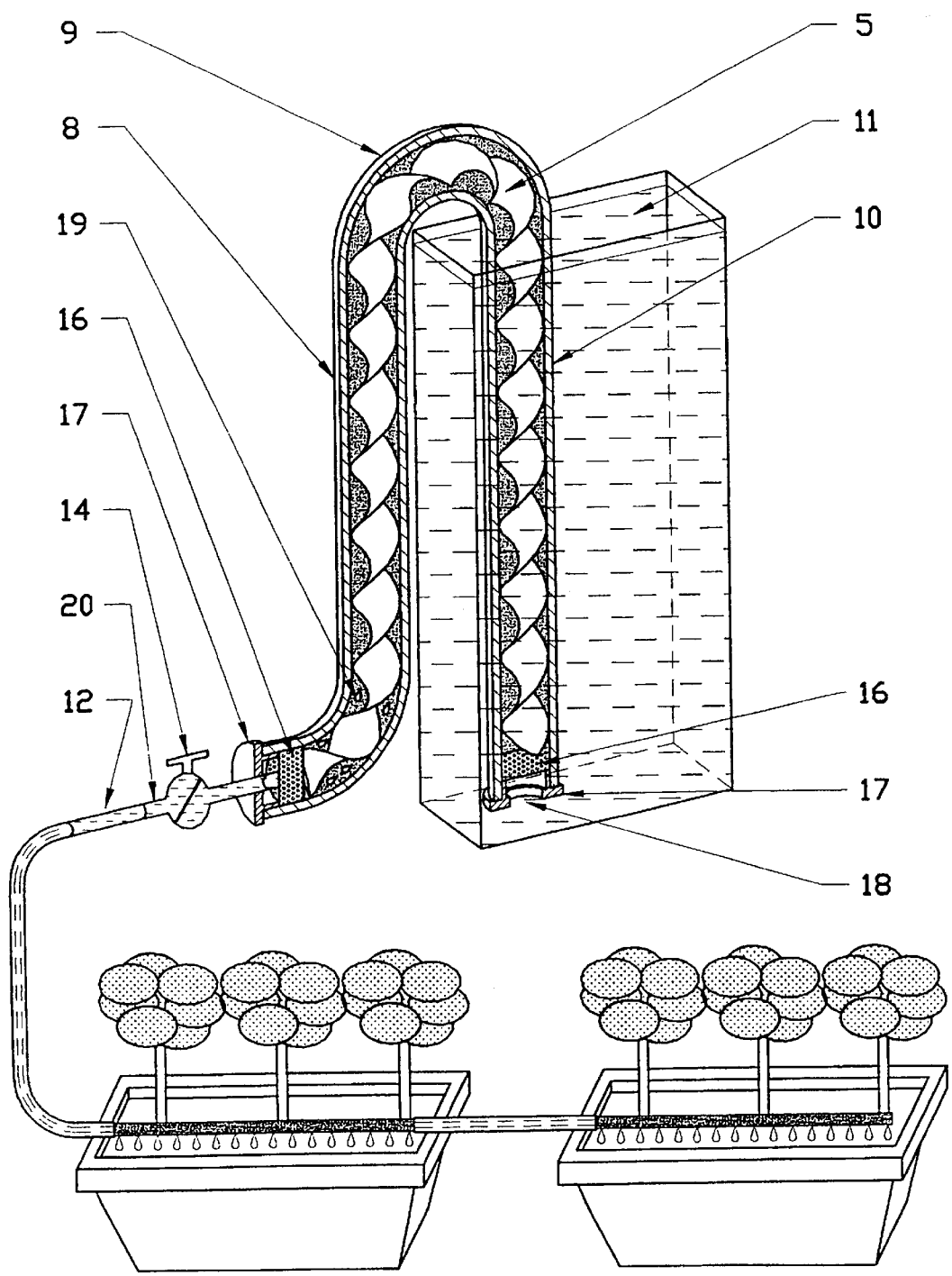

In the case of FIG. 10, the granular material (15) is stabilised by a semi-rigid plastic element made from a strip which has been twisted and which is then introduced into the tube.

This twisted strip is sufficiently supple to be able to be introduced into the crook and follow its curves.

The strip of FIG. 10 has a width of 10 mm. It is realised with a thermoplastic material which is heat twisted in order to obtain a helical form with steps equal to 16 mm.

It is introduced inside a crook with an interior diameter of 12 mm. There is slight play between the edges of the twisted strip (5) and the interior of the tube. The granular material is then easily introduced inside the device because it turns around the spiral.

The tube forming the crook in the preceding examples is closed at its two ends by hydrophilic filters, for example a foam pad (16) whose channels have dimensions lower than those of the smallest grains of the granular material.

These hydrophilic filters are kept in place by stoppers (17) which include an aperture (18) in their centre.

The aperture of one of the two stoppers is compatible in dimensions with the valve (14) which is embedded in it.

Figure 11:
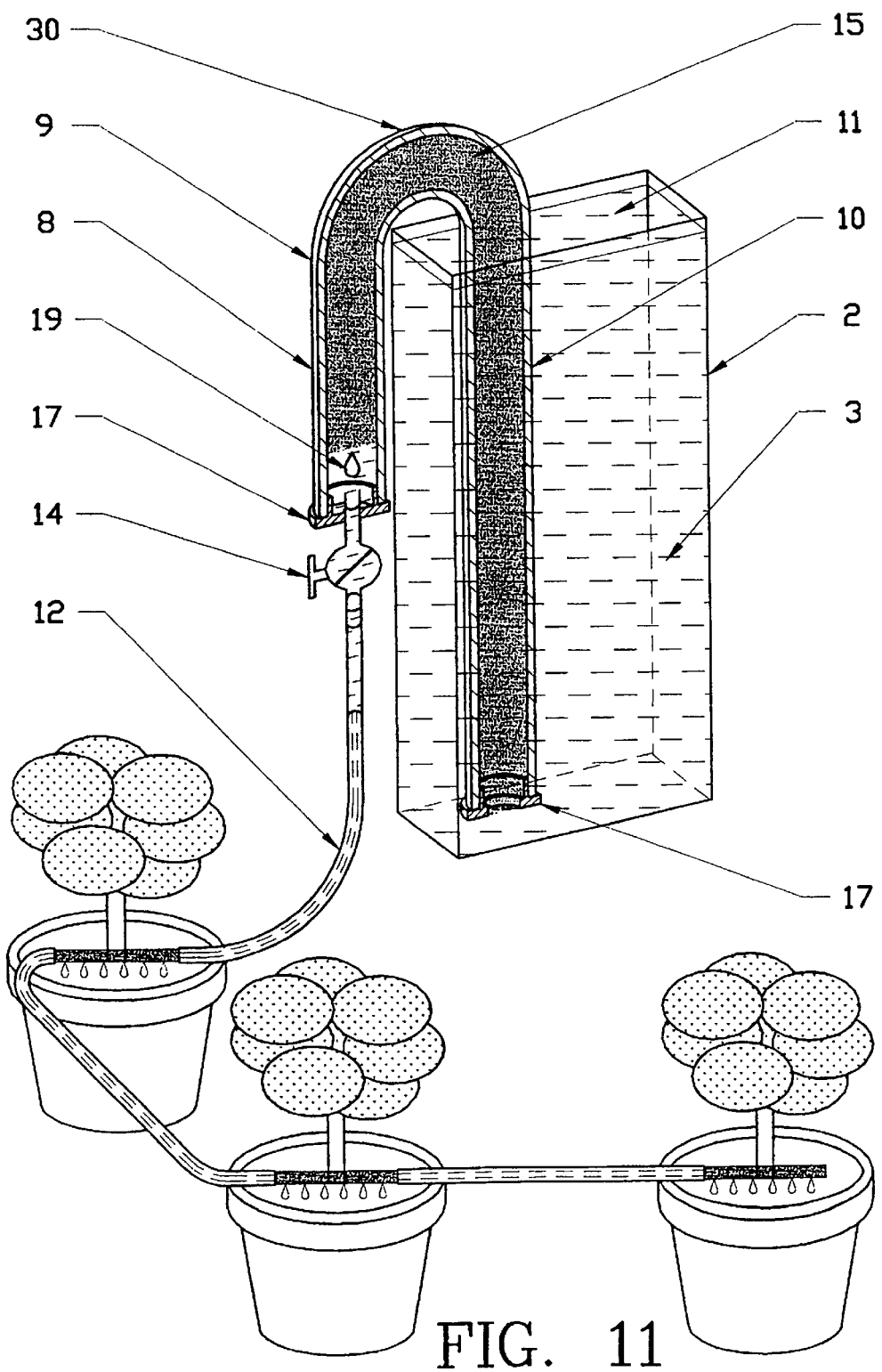

Since it is advantageous, once the siphon is drained, to save as much water as possible inside the tube, in order to accelerate re-priming, tube (9) is closed at its two ends by stoppers (17) comprising only one hole with a diameter equal to that of pipe (12) (FIG. 11).

The self-priming siphon, which is the subject matter of the invention, is used in numerous cases where it is necessary to lead a liquid contained in a receptacle (2) towards one or more other points of distribution.

The siphon according to the invention is intended for watering vegetables, for example from a reservoir with a constant level, of the "flushing water" type—the flow being regulated thanks to the tap (14) from zero to several hundreds of liters per day, according to the quantity of plants to be watered.

The end of the pipe via which the water flows can be extended by a porous pipe which can be empty or filled with sand. Thus the flow will not take place at a single point but along the whole length of the porous pipe. This will be intended for the watering of receptacles of elongated shape, such as window boxes.

The porous tube can be made of textile material or rubber so as to be supple.

The device which is the subject matter of the invention, can also act as an overflow for receptacles, for example aquariums, or simply to drain them.

Tube (9) in the embodiments referred to is made of rigid or semi-rigid material but can be a supple pipe containing hydrophilic material which is possible crossed by a pipe (31).

It can then be used to empty puddles of water on terraces (82) FIG. 12.

Portion (10) of pipe (9) can then be made to run along the terrace to the lowest point of this terrace, the other portion (8), extended by pipe (12), being made to hang on the exterior of the terrace.

This device can likewise be used to empty puddles on tarpaulins, for example on a swimming pool.

What is claimed is:

1. Self-priming siphon formed by a tube whose shape is similar to that of an inverse U, inside which is found hydrophilic material, comprising a rising branch (10), a bend and a descending branch (8), characterised by the fact that the descending branch (8) of the tube (9) is extended by a pipe (12) with a smaller diameter than the diameter of tube (9) in such a manner that when the other rising branch (10) of tube (9) is plunged into a receptacle (2) containing a liquid (3), and the latter fills rising branch (10) of tube (9) up to a higher level (11) of said liquid, then continues its ascension by capillary action to cross the high point (30) of tube (9) and fall again descending branch (8) as far as pipe (12), it forms there columns (20), which carried along by their weight, cause a suction priming the siphon, if the level of the exit of the pipe (12) is lower than the level (11) of the liquid.

2. Siphon according to claim 1, characterised by the fact that the tube (9) is made of a supple material, permitting it to adapt the inverted U shape to the shape of the receptacle (2).

3. Siphon according to claim 1, characterised by the fact that the tube (9) is made of a semi-rigid material.

4. Siphon according to claim 1, characterised by the fact that two separate paths are provided for the circulation of water:
   a path containing the hydrophilic material in which the water circulates by capillary action:
   a free path into which flows the greater part of the water which is sucked up when the siphon is primed.

5. Siphon according to claim 4, characteised by the fact that the free path is constituted by the space delimited between the internal wall of tube (9) and the hydrophilic material contained in a leak-proof envelope open at two ends.

6. Siphon according to claim 4, characterised by the fact that the free path is constituted by at least one pipe with a diameter significantly smaller than that of tube (9), and circulating inside the hydrophilic material.

7. Siphon according to claim 4, characterised by the fact that the free path is constituted by a pipe (31) placed outside tube (9), and then connected to tube (12) or to chamber (34).

8. Siphon according to claim 7, characterised by the fact that pipe (31) is extended outside tube (9) on the side of branch (10) so as to be able to reach a deeper point of the receptacle (2).

9. Siphon according to claim 8, characterised by the fact that means are provided for blocking tube (9) whilst leaving pipe (31) open, when the liquid drops and approaches the level of the entrance of tube (9).

10. Siphon according to claim 9, characterised by the fact that pipe (31) being placed outside tube (9), a float valve (42) closes the entrance of the branch of tube (9) when the liquid reaches a pre-determined level.

11. Siphon according to claim 4, characterized by the fact that the free path is constituted by at least one pipe with a diameter significantly smaller than that of tube (9) and circulating beside the hydrophilic material.

12. Siphon according to claim 1, characterised by the fact that the branch (8) of tube (9) comprises at its end a bend (32) and a small horizontal portion (33) which forms a chamber (34) intended to hold a reserve of water during the draining of the siphon.

13. Siphon according to claim 12, characterised by the fact that inside chamber (34), an extension (35) of pipe (12) makes it possible to save a portion of the water in the chamber (34).

14. Siphon according to claim 12, characterised by the fact the pipes (31) and (12) are formed by a single continuous tube, comprising at the level of chamber (34) at least one hole (36) permitting liquid arriving by capillary action in chamber (34) to enter pipe (12).

15. Siphon according to claim 1 characterised by the fact that the descending branch (8) presents a greater volume than the rising branch (10), in such a way as to contain more hydrophilic material, in order to constitute a reservoir for the liquid intended for re-priming the siphon.

16. Siphon according to claim 1 characterised by the fact that the hydrophilic material is granular material.

17. Siphon according to claim 1 characterised by the fact that the hydrophilic material is a granular material stabilised inside tube (9) by a structure formed of netting.

18. Siphon according to claim 1, characterised by the fact that the diameter of pipe (12) is between 1 and 6 mm.

19. Siphon according to claim 1, characterized by the fact that the diameter of pipe (12) is between 2 and 5 mm.

20. Siphon according to claim 1, characterised by the fact that the diameter of pipe (12) is close to 4 mm.

21. Siphon according to claim 1, characterised by the fact that there is disposed on pipe (12) a tap making it possible to adjust the rate of flow.

22. Siphon according to claim 1, characterized by the fact that the tube (9) is made of rigid material.

23. Siphon according to claim 1 characterised by the fact that the hydrophilic material is a granular material stabilized inside tube (9) by a structure formed of a twisted part.

24. Siphon according to claim 1 characterised by the fact that the hydrophilic material is a granular material stabilized inside tube (9) by a structure formed of spikes.

25. Siphon according to claim 1 characterised by the fact that the hydrophilic material is a granular material stabilized inside tube (9) by a structure formed of projections.

26. Siphon according to claim 1 characterised by the fact that the hydrophilic material is a granular material stabilized inside tube (9) by a structure formed of grooves.

* * * * *